United States Patent
Homann et al.

(10) Patent No.: US 6,785,619 B1
(45) Date of Patent: Aug. 31, 2004

(54) GEOREFERENCED MONITORING SYSTEM

(75) Inventors: Klaus Homann, Dortmund (DE); Burkhard Katzenbach, Dortmund (DE)

(73) Assignee: Westfälische Ferngas-AG, Dortmund (DE)

( * ) Notice: Subject to any disclaimer, the term of this patent is extended or adjusted under 35 U.S.C. 154(b) by 0 days.

(21) Appl. No.: 09/869,487

(22) PCT Filed: Dec. 27, 1999

(86) PCT No.: PCT/EP99/10394

§ 371 (c)(1),
(2), (4) Date: Jun. 28, 2001

(87) PCT Pub. No.: WO00/40891

PCT Pub. Date: Jul. 13, 2000

(30) Foreign Application Priority Data

Dec. 31, 1998 (DE) .......................................... 198 60 892
Feb. 25, 1999 (DE) .......................................... 199 07 995

(51) Int. Cl.[7] .............................................. G01F 17/00
(52) U.S. Cl. .......................... 702/51; 702/24; 702/188; 340/500; 340/539.13
(58) Field of Search ............................. 702/51, 24, 188; 73/29.01, 23.2, 23.34, 31.05; 356/519; 340/521, 522, 531, 539, 539.13, 539.11, 500

(56) References Cited

U.S. PATENT DOCUMENTS

| 4,742,336 A | * | 5/1988 | Hall et al. .................. 340/531 |
| 5,446,445 A | * | 8/1995 | Bloomfield et al. ........ 340/521 |
| 5,946,095 A | * | 8/1999 | Henningsen et al. ........ 356/519 |
| 6,422,061 B1 | * | 7/2002 | Sunshine et al. ........... 340/603 |

FOREIGN PATENT DOCUMENTS

| DE | 39 09 337 A1 | 9/1990 |
| DE | 42 31 882 A1 | 3/1994 |
| EP | 99/10394 | 5/2000 |

* cited by examiner

Primary Examiner—John S. Hilton
Assistant Examiner—Hien Vo
(74) Attorney, Agent, or Firm—Cook, Alex, McFarron, Manzo, Cummings & Mehler, Ltd.

(57) ABSTRACT

The invention relates to a mobile measuring device that monitors potential leaks of gas conduits. The device includes a navigation system.

9 Claims, 3 Drawing Sheets

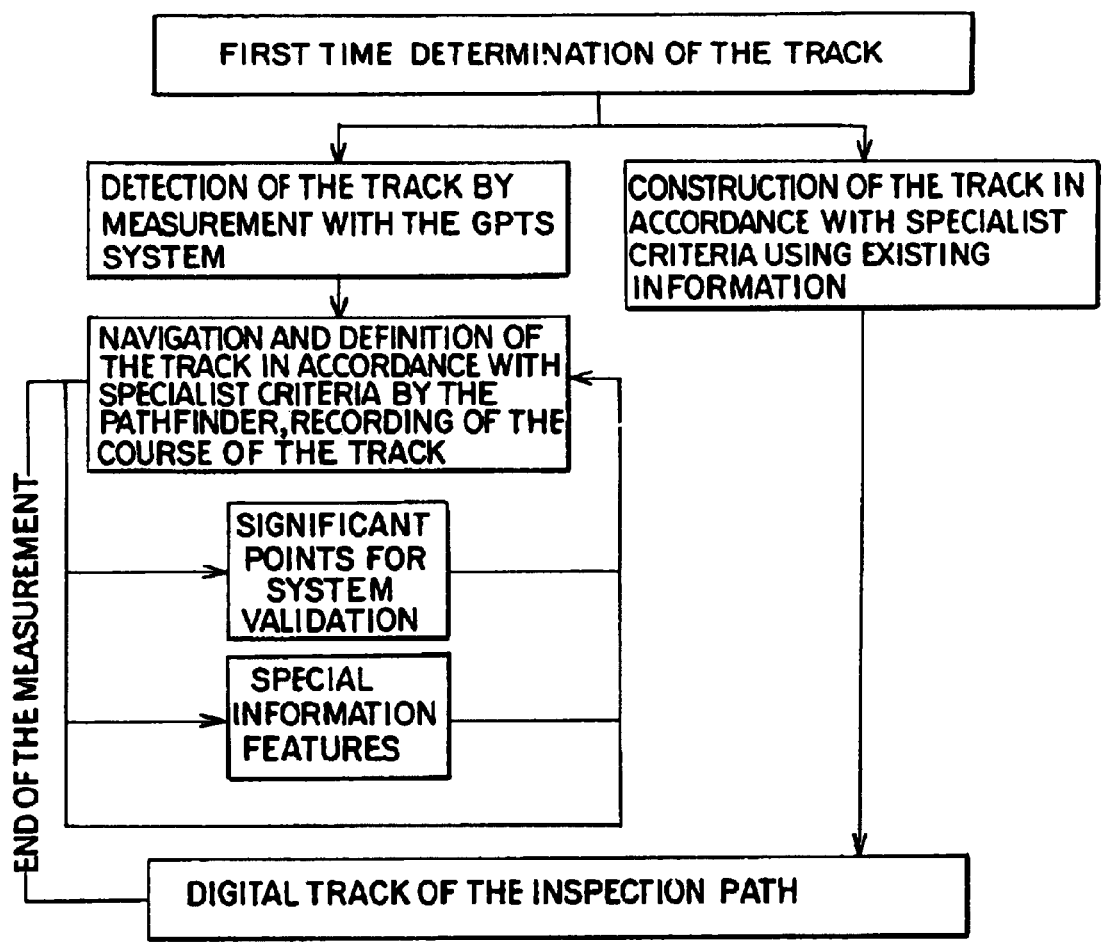

GEOREFERENCED MONITORING SYSTEM

CROSS REFERENCE TO RELATED APPLICATIONS

This is a national stage application based International Application No. PCT/EP99/10394, filed Dec. 27, 1999, which claims priority from German Application No. 198 60 892.6, filed Dec. 31, 1998, and German Application No. 199 07 995.1, filed Feb. 25, 1999.

BACKGROUND OF THE INVENTION

The invention relates to a system for monitoring supply lines, such as gas lines laid underground.

In the prior art, gas supply lines are monitored with the aid of a measuring group, comprising a path finder and a tracer. Such measuring groups carry out checks on the gas supply lines for their tightness at regular intervals, on account of the statutory monitoring obligation of the power supply companies.

The actual activity of such a measuring group consists in patroling the gas supply lines and determining a possible escape of supply gas by using a gas tracing instrument. The course of gas supply lines, generally laid underground, is naturally not readily detectable, so that a pathfinder, as a part of the measuring group, is responsible for the proper following of the measuring path. The gas tracing instrument is guided by the "tracer" in accordance with the navigation instructions from the pathfinder.

This procedure is relatively complicated, since the pathfinder, in the initial part of the monitoring operation, has to draw up extracts from maps and work out a suitable tracing path. During the measuring operation, the pathfinder is normally responsible for monitoring the completeness of the measurement and recording the measured results.

In this case, the line sections inspected are marked in writing with the points of note relevant to the operation of the line system. The recordings are used with respect to the responsible inspecting authorities as proof of the monitoring obligation placed by statute on the power supply company.

In the procedure described above, the use of at least two persons is absolutely necessary.

Furthermore, the reliability of the measurement depends both on the care of the pathfinder and the care of the tracer. For example, it is conceivable for the pathfinder, in the event of an inaccurate procedure, to deviate from the measurement path necessary for the verification of a gas escape and, as a result, a gas escape location will be overlooked. In addition, there is the risk of information losses arising from incomplete or faulty recording of the monitoring results.

BRIEF SUMMARY OF THE INVENTION

The invention is, then, based on the object of providing a monitoring system which avoids the aforementioned disadvantages and permits reliable monitoring.

The problem is solved by the independent claim 1. Advantageous embodiments are reproduced in the subclaims.

In detail, the problem of the invention is solved by a mobile measuring device being combined with an electronic guidance system which preferably has recourse to existing satellite-assisted navigation system in conjunction with a geographical information system for generating the navigation information.

Particular preference is given to a combination of a mobile measuring device with navigation system with automatic documentation of the measured results and/or acoustic or optical guidance of the operator by using the navigation data determined.

With the aid of the measuring device according to the invention, the monitoring operation can be carried out by a single person. By using the computer-controled navigation and documentation, the monitoring becomes largely independent of the reliability of the operator.

A particular advantage consists in the fact that the safety of the operator during the monitoring operation is increased considerably. Because of the actual course of the gas line, it is often necessary to inspect locations at risk from traffic during a monitoring operation. The fact that substantial monitoring functions are performed by the mobile device permits the operator to direct his concentration to avoiding hazards during the inspection. In particular if an acoustic guidance system is used, the concentration potential of the operator is largely free and is therefore available, for example, for avoiding hazards.

A recording of the track of the path patroled, as implemented by one embodiment of the measuring device, provides the advantage of permitting exact local allocation of the measured values.

In the following text, the invention will be described in detail using an exemplary embodiment illustrated in the drawing, in which:

BRIEF DESCRIPTION OF SEVERAL VIEWS OF THE DRAWINGS

FIG. 3 shows a flow diagram of a first-time determination of a track with the aid of the measuring device according to the invention.

DETAILED DESCRIPTION OF THE INVENTION

Figure 1:
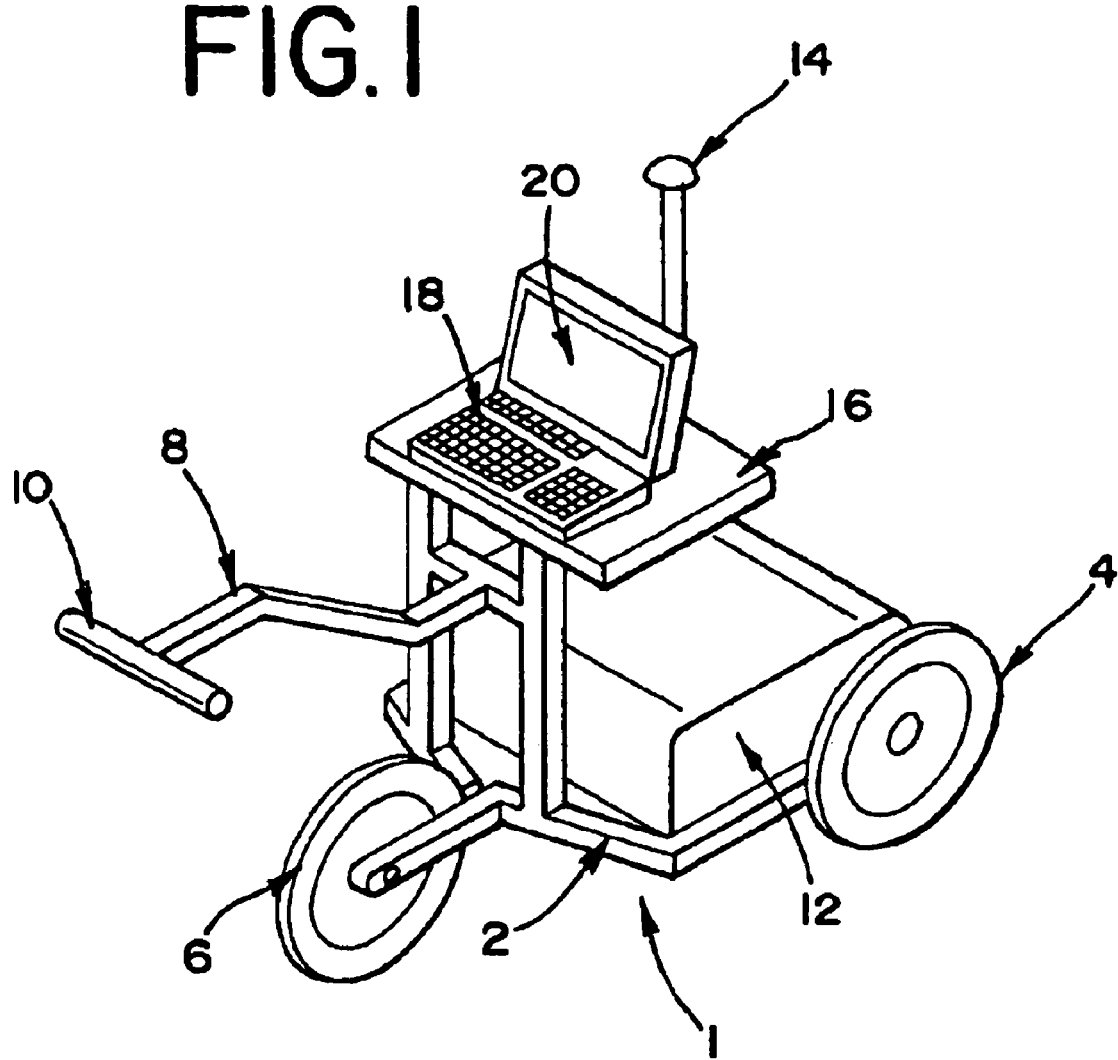
FIG. 1 shows a mobile measuring device according to the invention.

The mobile measuring device 1 comprises a frame 2 having rollers 4, 6 and a guide arm 8 with a guide handle 10. Arranged on the frame are measuring electronics 12 with satellite and dead-reckoning navigation devices, gas testing devices and a power supply. In addition, the frame has an antenna 14 to receive satellite and correction data, and also a table 16 arranged in the area of the guide arm 8 and having a computing unit 18.

The frame is equipped with three running wheels, the central running wheel 6 being used at the same time as a measuring wheel for the distance and being connected to the computing unit.

The computer is arranged on the table in such a way that the operator, when guiding the mobile measuring device 1 at the handle 10 can read data displayed on the monitor 20 of the computer 18 during the inspection. The computer 18 also has a device for transmitting an acoustic signal to the operator.

For the purpose of determining position with the aid of the satellite navigation device 12 and the antenna 14, recourse is initially made to existing satellite navigation systems, such as GPS (USA) and Glonass (Russia). A differential method is added to the aforementioned systems in order to increase the accuracy of the location determination. For this purpose, recourse can be made to correction methods which are already available, such as the SAPOS-HEPS real-time positioning system of the German land survey offices or a known reference station of the power supply company or line operator. If the accuracy of the pure satellite navigation position is adequate, the system may also be operated without reference points.

In order to bridge brief outages during the reception of the satellite signals, the use of an additional dead-reckoning navigation system is advantageous. With the latter system, the last position determined by the satellite system is extrapolated in terms of magnitude and direction by means of a distance vector until the satellite system supplies reliable data again.

The magnitude of the distance vector can be recorded, for example, by means of sensors in the measuring wheel 6. An indirect distance measurement can be achieved with the aid of speed sensors, by means of simple integration of the measured signal. A further indirect possibility for measuring the distance consists in the double integration of the measured signal from an acceleration transmitter.

The direction of the distance vector can be obtained directly via an electronic compass or indirectly via an orthogonal pair of speed sensors. In addition, an inertia measuring system, for example in the form of a gyroscope or a two-axis orthogonal acceleration sensor, can be used to record the direction.

For the purpose of navigating the gas tracing instrument, use is preferably made of a geographic information system which is matched to the actual conditions of the area being monitored. It permits the position information to be linked to the topographic information about the area being monitored. Initialization of the position measuring system is needed as a basis for this linking. For this purpose, use may be made of correction data from external providers or correction data determined with the aid of dedicated stations at points whose coordinates are known. Also suitable is the determination of correction data by means of the operation of reference stations arranged in any desired way in the environment of such points. The coordinates of the reference station are then determined by means of measurements with reference to at least one point whose coordinates are known.

The aforementioned initialization methods supply positioning coordinates in a reference system which is defined mathematically uniquely, such as WGS 84, which may be converted into real topographical information via appropriate transformation formulations.

The topographical information needed for navigation can be derived from existing network information systems from the power supply companies and, before the beginning of the inspection, can be transmitted to the computer unit 18 for the area to be examined.

The control path to be patroled does not have to agree with the actual course of the supply lines. This is particularly the case in gas lines which are laid under sealed surfaces, since an escape of gas can be measured only in the edge regions of the sealed surface.

After being input into the computer unit 18, specialist information of this type is balanced with the positioning and distance data and taken into account in the guidance of the operator by means of the measuring device according to the invention. This can be carried out, for example, by means of integration of a digital track into the system. The track may be derived from available data and knowledge and entered into the computer unit 18.

A particular advantage of the measuring device according to the invention is that it permits automatic track recordings. The track, for example recorded within the context of a first inspection, can be used for all subsequent measurements.

Figure 2:
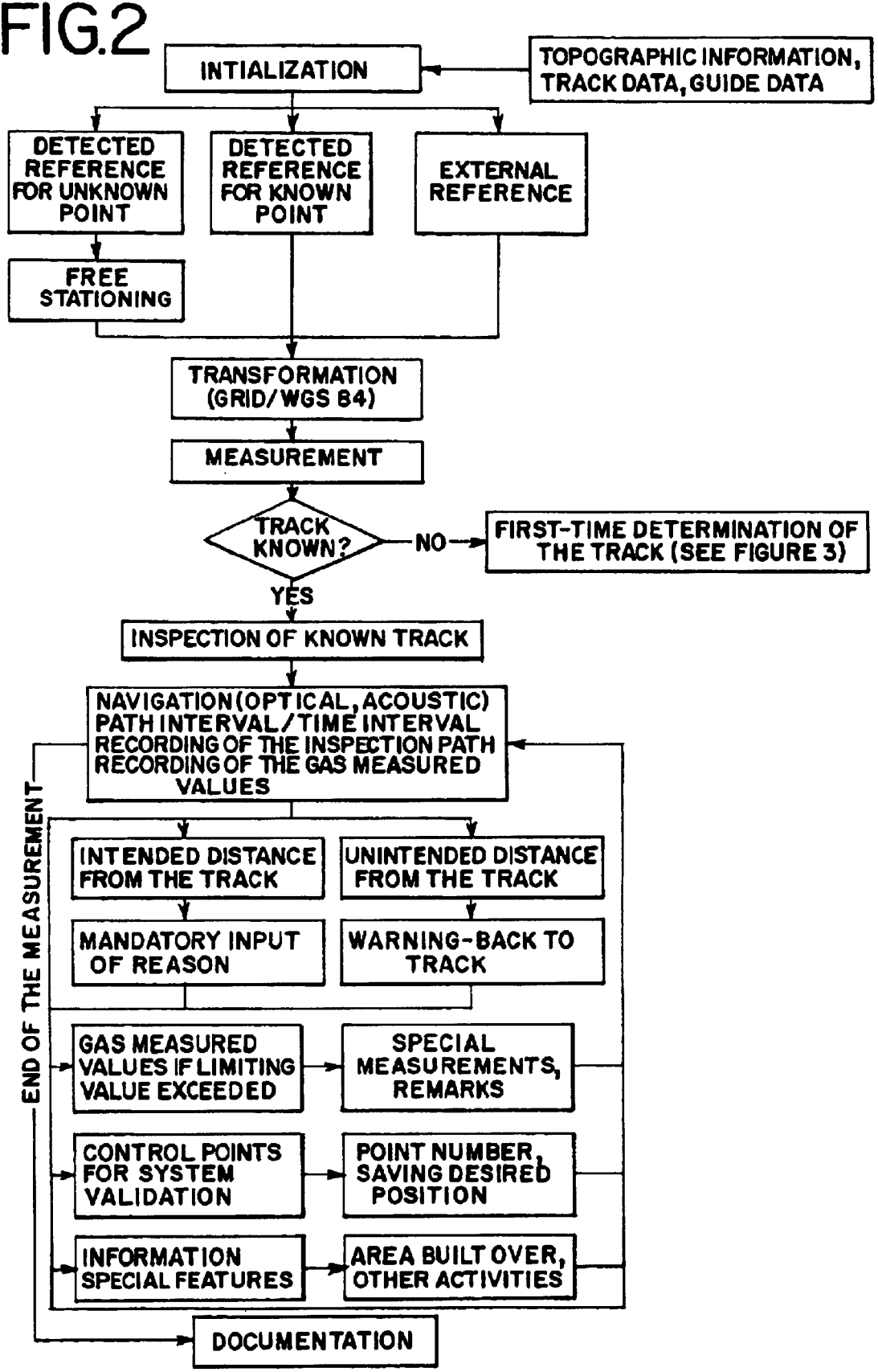
FIG. 2 shows a flow diagram of a monitoring inspection with the aid of the measuring device according to the invention.

FIG. 2 illustrates a flow diagram of the inspection over a gas line using the device according to the invention, while FIG. 3 illustrates a flow diagram of a recording of a digital track in the course of the first inspection.

In the procedure illustrated in FIG. 2, the operator is guided along the track predefined by the computer. In the process, the computer takes into account a tolerance band to the left and right of the desired path, and if this path is left, this is pointed out, and the operator, if this is intended, must react with an input of the reason for leaving the desired path. This reason is in turn processed in the documentation system of the computer unit and may be available during the next inspection.

In the event of an increased gas concentration being determined by the gas tracing instrument, the operator is given specific, standardized instructions in order to ensure reproducible documentation of the gas escape.

It is particularly advantageous to use a cable-free earpiece/microphone combination for the communication between the operator and computer unit, in addition to the display, loud speaker and keyboard. By means of these measures, the concentration of the operator is largely released for other tasks.

Overall, the invention therefore permits secure line monitoring with a low outlay on personnel.

What is claimed is:

1. A mobile measuring device for monitoring leaks on gas lines, comprising an electronic navigation system to guide an operator along a track predefined by a computer unit which links position information to topographic information about the area to be monitored stored in said computer unit to generate said predefined track, and a documentation system to document results measured by a gas testing device mounted thereon.

2. The device as claimed in claim 1, characterized by a satellite position measuring system.

3. The mobile measuring device as claimed in claim 1, characterized by acoustic and/or optical guidance of an operator, using calculated navigation data.

4. The mobile measuring apparatus as claimed in claim 1, characterized by a supporting/measuring wheel.

5. The mobile measuring device as claimed in claim 4, characterized in that, by using the supporting/measuring wheel, a record of the path covered is recorded by the computer unit.

6. The device as claimed in claim 2, comprising a supporting/measuring wheel wherein the satellite position measuring system is coupled with sensors on said supporting/measuring wheel.

7. The device as claimed in claim 2, characterized in that the satellite position measuring system is coupled with sensors in measuring electronics, which extrapolate information about the position of the mobile measuring device by generating a distance vector in the computer unit.

8. The device as claimed in claim 7, characterized in that the direction component of the distance vector and/or the magnitude or the distance vector is/are generated via an electric compass, an orthogonal pair of speed sensors, a two-axis orthogonal acceleration sensor or a gyroscope. sensor or a gyroscope.

9. A method of monitoring gas lines, comprising:

feeding navigation information about a predefined path into an electronic navigation system;

producing signals indicating the path to be taken by means of the electronic navigation system; and moving a mobile measuring device in response to the signals indicating the path to be taken.

* * * * *